United States Patent
Darby et al.

(10) Patent No.: US 9,447,916 B2
(45) Date of Patent: Sep. 20, 2016

(54) SECURING AN AIR CONDITIONING UNIT TO A BUILDING BY APPLYING FORCE TO AN INTERIOR AND AN EXTERIOR SURFACE OF THE BUILDING

(71) Applicant: Nation Wide Products, Inc., Abilene, TX (US)

(72) Inventors: Jason Darby, Abilene, TX (US); Jim Mann, Palestine, TX (US)

(73) Assignee: Nation Wide Products, Inc., Abilene, TX (US)

( * ) Notice: Subject to any disclaimer, the term of this patent is extended or adjusted under 35 U.S.C. 154(b) by 256 days.

(21) Appl. No.: 13/633,095

(22) Filed: Oct. 1, 2012

(65) Prior Publication Data
US 2014/0090334 A1    Apr. 3, 2014

(51) Int. Cl.
| | |
|---|---|
| F24F 13/32 | (2006.01) |
| F16M 13/02 | (2006.01) |
| F24F 1/02 | (2011.01) |
| E04G 3/18 | (2006.01) |
| A47L 3/02 | (2006.01) |
| F24F 1/62 | (2011.01) |

(52) U.S. Cl.
CPC ............... *F16M 13/022* (2013.01); *A47L 3/02* (2013.01); *E04G 3/18* (2013.01); *F24F 1/027* (2013.01); *F24F 1/62* (2013.01); *F24F 13/32* (2013.01); *F24F 2221/20* (2013.01)

(58) Field of Classification Search
CPC ........... E04G 3/18; F24F 1/027; F24F 13/32; A47L 3/02
USPC .................. 248/208, 236, 674, 678
See application file for complete search history.

(56) References Cited

U.S. PATENT DOCUMENTS

| | | | | | |
|---|---|---|---|---|---|
| 194,718 | A | * | 8/1877 | Palmer ............................ | 182/57 |
| 274,334 | A | * | 3/1883 | Hurley ............................ | 182/57 |
| 399,491 | A | * | 3/1889 | Bukawietis ..................... | 182/62 |
| 495,810 | A | * | 4/1893 | Iseminger ....................... | 182/59 |
| 593,501 | A | * | 11/1897 | Timmis ........................... | 182/57 |
| 598,860 | A | * | 2/1898 | Dean ............................... | 182/62 |
| 652,010 | A | * | 6/1900 | Wheeler ......................... | 248/236 |
| 660,174 | A | * | 10/1900 | Tischer .......................... | 182/59 |
| 795,451 | A | * | 7/1905 | Rice ............................... | 182/61 |
| 823,921 | A | * | 6/1906 | Christopherson ............. | 182/62 |

(Continued)

FOREIGN PATENT DOCUMENTS

GB          2411686 A  *  9/2005  ............... E04G 3/18

OTHER PUBLICATIONS

International Search Report and Written Opinion issued for PCT/US2013/062412, dated Feb. 25, 2014, 8 pages.

*Primary Examiner* — Terrell McKinnon
*Assistant Examiner* — Eret McNichols
(74) *Attorney, Agent, or Firm* — Norton Rose Fulbright US LLP (57) ABSTRACT

A system for securing an air conditioning unit to a building without the need for any alteration and/or damage to the building itself. The system includes a cross bar, an air conditioning unit support, and a strut. The arrangement of the components results in the cross bar applying an outward force to an interior surface of the building and strut applying an inward force to an exterior surface of the building in response to the downward force exerted on the air conditioning unit support. The sum of the forces applied on the surfaces of the building are sufficient to secure the air conditioning unit to the building.

15 Claims, 2 Drawing Sheets

(56) References Cited

U.S. PATENT DOCUMENTS

| | | | |
|---|---|---|---|
| 829,537 A * | 8/1906 | Mills | 182/61 |
| 917,175 A * | 4/1909 | Smith | 182/58 |
| 1,142,596 A * | 6/1915 | Mangisch | 182/56 |
| 1,275,053 A * | 8/1918 | Leiding | 52/37 |
| 1,321,869 A * | 11/1919 | Wilson | 182/100 |
| 1,336,283 A | 4/1920 | Cook | |
| 1,517,585 A * | 12/1924 | Richardson | 182/58 |
| 1,518,091 A * | 12/1924 | Mathis et al. | 52/37 |
| 1,531,159 A * | 3/1925 | Timmons | 248/236 |
| 1,601,471 A * | 9/1926 | Fowler | 182/62 |
| 1,625,423 A * | 4/1927 | Peckenpaugh | 182/62 |
| 1,663,279 A * | 3/1928 | Portt | 182/62 |
| 1,679,961 A * | 8/1928 | Embrey | 182/57 |
| 1,701,301 A * | 2/1929 | Goodwin | 248/240.3 |
| 1,823,771 A * | 9/1931 | Thrasher | 182/62 |
| 1,894,878 A * | 1/1933 | La Grange | 182/61 |
| 1,949,820 A * | 3/1934 | Timmons | 182/59 |
| 1,957,184 A * | 5/1934 | Smith | 248/236 |
| 2,037,438 A * | 4/1936 | Roth | 182/53 |
| 2,049,353 A * | 7/1936 | Cary | 182/62 |
| 2,059,739 A * | 11/1936 | Ment et al. | 182/61 |
| 2,116,427 A | 5/1938 | Duncan | |
| 2,219,642 A * | 10/1940 | Whiteman | 182/60 |
| 2,273,370 A * | 2/1942 | Oberti | 182/58 |
| 2,292,379 A * | 8/1942 | Jirasek | 182/62 |
| 2,420,635 A * | 5/1947 | Workman | 182/61 |
| 2,568,968 A * | 9/1951 | Perrin | 248/236 |
| 2,583,613 A * | 1/1952 | Talbott | 49/465 |
| 2,678,243 A * | 5/1954 | Masse | 182/120 |
| 2,736,615 A * | 2/1956 | Gormley | 182/55 |
| 2,891,754 A * | 6/1959 | Kuhlenschmidt et al. | 248/208 |
| 2,935,284 A | 5/1960 | Reeves | |
| 3,010,534 A * | 11/1961 | Borke | 182/58 |
| 3,257,933 A | 6/1966 | Baylinson | |
| 3,273,843 A * | 9/1966 | Bell, Jr. et al. | 248/208 |
| 3,394,910 A * | 7/1968 | Ulich | 248/208 |
| 3,727,721 A * | 4/1973 | Kulesa | 182/62 |
| 5,203,426 A * | 4/1993 | Sydnor | 182/57 |
| 5,636,816 A | 6/1997 | Burton et al. | |
| 5,823,289 A | 10/1998 | Csomos | |
| 5,967,478 A * | 10/1999 | Tynes | 248/241 |
| 6,233,877 B1 * | 5/2001 | Monroe | 52/37 |
| 6,367,750 B1 * | 4/2002 | Ford | 248/208 |
| 6,731,250 B1 * | 5/2004 | Berman | 343/878 |
| 6,767,278 B1 * | 7/2004 | Peterson | 454/196 |
| 7,753,334 B2 * | 7/2010 | Schreiber | 248/351 |
| 8,091,844 B1 * | 1/2012 | Bragg | 248/208 |
| 8,533,955 B2 * | 9/2013 | Agnihotri | 29/897.3 |
| 8,584,998 B1 * | 11/2013 | Peterson | 248/208 |
| 8,657,131 B2 * | 2/2014 | Pixler | 211/123 |
| 2010/0270448 A1 * | 10/2010 | Boccia et al. | 248/208 |
| 2012/0137499 A1 * | 6/2012 | Agnihotri | 29/462 |
| 2015/0107277 A1 * | 4/2015 | Moore | F24F 1/027 62/77 |

* cited by examiner

SECURING AN AIR CONDITIONING UNIT TO A BUILDING BY APPLYING FORCE TO AN INTERIOR AND AN EXTERIOR SURFACE OF THE BUILDING

BACKGROUND

Air conditioners are often secured adjacent to or partially within building windows, where a portion of the air conditioning unit is located outside of the building while the air conditioning unit operates. Such an arrangement prevents hot air resulting from operation of the air conditioning unit from entering the building that is being cooled. Since a portion of the air conditioning unit extends beyond the exterior of a building, there exists a potential for the air conditioning unit to fall from the window to the surface below. Of course, this is particularly problematic in urban areas, where several of such air conditioning units may be found in a single building, several stories above the ground surface. As a result, strict safety regulations have been developed in some urban areas with regard to the installation and maintenance of window air conditioning units. For example, the New York City Building Code sets forth specific guidelines that must be adhered to when such a unit is installed. Further, to date, air conditioners have been attached to a building utilizing support structures that are built into the building itself. As such, if the support system falters or is removed, the building is permanently altered or damaged. Therefore, a need exists for an air conditioning unit support system that provides sufficient safety and does not damage or otherwise modify the building to which is secured.

BRIEF SUMMARY

In one aspect of the present disclosure, an air conditioning unit support system secures an air conditioning unit to a building while complying with municipal ordinances and other applicable safety requirements and allowing the air conditioning unit to efficiently operate without requiring any modification and/or damage to the building itself. The air conditioning unit support system includes a first member configured to extend beyond the width of an aperture of a building and abut an interior surface of the building on either side of the aperture. The system also includes a second member extending from a medial portion of the first member, where the second member is configured to support the air conditioner. The system further includes a third member extending between the second member and an exterior surface of the building.

In another aspect of the present disclosure, a system for securing an air conditioning unit to a building includes a first member engaged with a second member and configured to apply an outward force to an interior surface of the building in response to a downward force applied to an upper surface of the second member by the air conditioning unit. The system also includes a third member engaged with the second member and configured to apply an inward force to an exterior surface of the building in response to the downward force applied to the upper surface of the second member by the air conditioning unit.

In another aspect of the present disclosure, a method for securing an air conditioning unit to a building includes utilizing a first member engaged with a second member to apply an outward force to an interior surface of the building in response to a downward force applied to an upper surface of the second member by the air conditioning unit. The method also includes utilizing a third member engaged with the second member to apply an inward force to an exterior surface of the building in response to the downward force applied to the upper surface of the second member by the air conditioning unit.

In another aspect of the present disclosure, a system for securing an air conditioning unit to a building includes a first member configured to be positioned about an interior surface of the building and a third member configured to be positioned about an exterior surface of the building. The first member and the third member are engaged with one another through a second member extending between the interior surface of the building and the exterior surface of the building and configured to support an air conditioning unit. Also, the third member is further configured to be actuated along the length of the second member between a first position and a second position. At the second position, the first member applies an outward force to the interior surface and the third member applies an inward force to the exterior surface, the sum of the forces sufficient to secure the air conditioning unit at the top surface of the second member.

In another aspect of the present disclosure, a method for securing an air conditioning unit to a building includes positioning a first member about an interior surface of the building and positioning a third member about an exterior surface of the building. The first member and the third member are engaged with one another through a second member extending between the interior surface of the building and the exterior surface of the building and configured to support an air conditioning unit. The method also includes actuating the third member along the length of the second member from a first position to a second position. At the second position, the first member applies an outward force to the interior surface and the third member applies an inward force to the exterior surface, the sum of the forces sufficient to secure the air conditioning unit at the top surface of the second member.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present invention, reference is now made to the following description taken in conjunction with the accompanying drawings, in which.

DETAILED DESCRIPTION

Embodiments described herein provide air conditioning unit support systems that secure an air conditioning unit to a building while 1) complying with municipal ordinances and other applicable safety requirements, and 2) allowing the air conditioning unit to efficiently operate without requiring any modification and/or damage to the building itself. Certain embodiments may be modular, comprising components that are of adjustable dimensions and configurations, being able to accommodate standard (albeit different) building dimensions and materials, window dimensions, and air conditioning units of various dimensions. This modularity also provides for easy packaging, assembly, and repair or flexible arrangement and use. Components of systems described herein are thought to advantageously comprise one or a combination of lightweight materials that impart sufficient strength such as, for example, steel, aluminum, or fiber-reinforced plastic, and the like. Accordingly, the entire weight of the air conditioning unit, which may be as much as sixty (60) pounds, is supported by systems described herein without modification and/or damage to the adjoining building.

Figure 1:
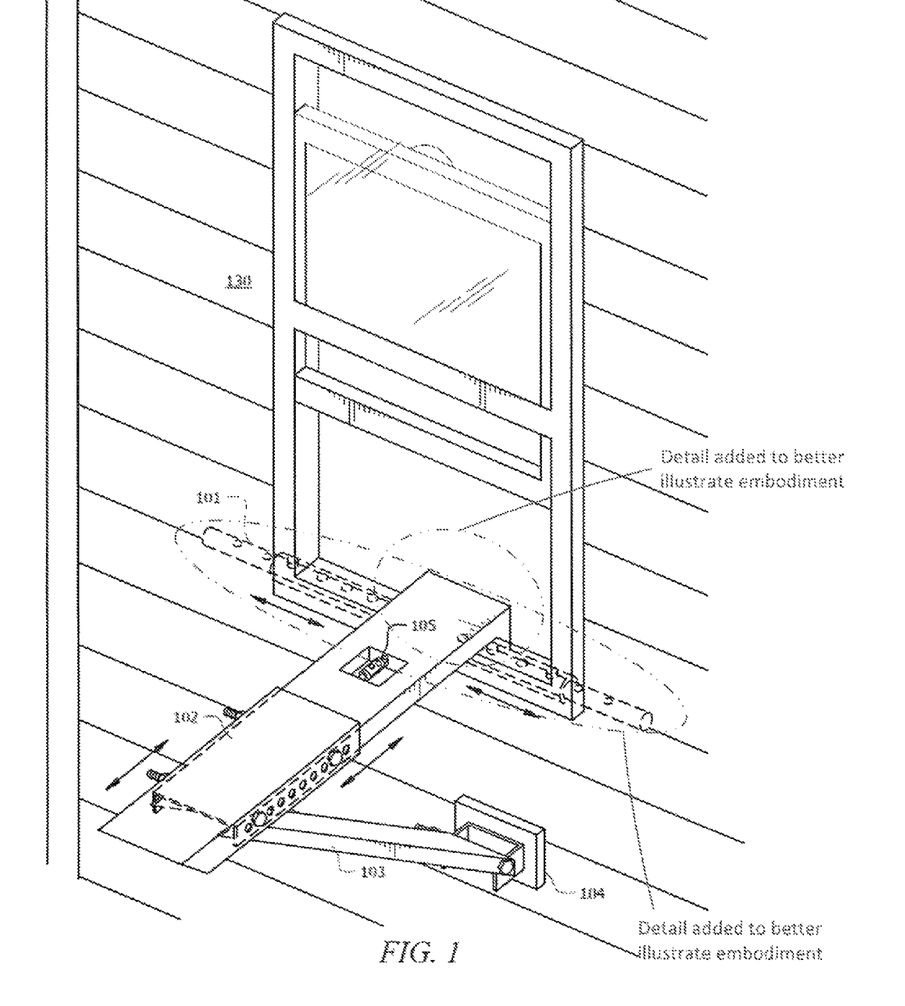
FIG. 1 illustrates an embodiment of a system for securing an air conditioning unit in which concepts described herein are applied.

FIG. 1 illustrates an embodiment of a system for securing an air conditioning unit in which concepts described herein are applied. According to FIG. 1, a first member (such as cross bar 101) is engaged with a second member (such as air conditioning unit support 102) and is configured to apply an outward force to an interior surface of a building (such as building 130) in response to a downward force applied to the upper surface of the second member by an air conditioning unit (such as air conditioning unit 120). A third member (such as strut 103) is engaged with the second member and configured to apply an inward force to the exterior surface of the building in response to the downward force applied to the upper surface of the second member by the air conditioning unit. That is, system 100 comprises cross bar 101, air conditioning unit support 102, and strut 103. As will be described in more detail, cross bar 101, air conditioning unit support 102, and strut 103 operate to secure air conditioning unit 120 to building 130 without requiring any damage and/or modification to building 130 while complying with stringent municipal ordinances and other applicable safety requirements.

Cross bar 101 is configured to extend beyond the width of an aperture of a building, e.g., a window, and abut an interior surface of the building on either side of the window. Further, cross bar 101 reversibly engages air conditioning unit support 102 by various attachment mechanisms. By way of example, cross bar 101 may comprise one or more notches that are configured to accept corresponding protrusions from air conditioning unit support 102 (e.g., by virtue of a male and female arrangement). In any event, cross bar 101 and air conditioning unit support 102 may form an engaged position such that each is locked with respect to one another and later be maneuvered by a user to an unengaged position, so that each may be moved or separated from one another. The reversible engagement between cross bar 101 and air conditioning unit support 102 (whether by a fastener, removable pins, or aligned notches and/or grooves) is advantageous because each may be folded with respect to one another for packaging, transport, and the like.

Optionally, a sealing member configured to seal the interior of building 130 from the exterior of building 130 may be formed around air conditioning unit support 102 and the surface of a window while air conditioning unit support 102 extends between the interior and exterior of building 130.

Cross bar 101 is variable in length so that system 100 may be utilized with windows of different widths. The length adjustments should be sufficient to permit a length of cross bar 101 to be adjusted so that the cross bar 101 is sufficiently wider than a width of the window opening. According to one embodiment, cross bar 101 comprises a central portion and two telescoping distal portions, each of which may be actuated between a retracted and extended position to ensure a desired length. According to another embodiment, cross bar 101 may comprise two pieces, where one slides along the length of another to form a desired length. In either case, consistent with the discussion herein, the length may be fixed by a reversible fastener means, one or more securing pins or bolts, or a latch mechanism. Finally, a soft material, such as rubber or a rubber composite, may cover cross bar 101 to prevent damage to the interior surface and/or window surrounding.

Air conditioning unit support 102 extends from cross bar 101 and supports air conditioning unit 120 along its top surface. That is, according to the illustrated embodiment, the electrical and mechanical components of air conditioning unit 120, such as the compressor, the evaporator, the fans and blowers, are supported by air conditioning unit support 102. The length of air conditioning unit support 102 may be adjusted to accommodate different air conditioning units and building walls of different thickness. According to one embodiment, air conditioning unit support 102 may comprise and outer sleeve and an inner sleeve, where its length is adjusted by sliding the inner sleeve and outer sleeve along their length with respect to one another. Further, air conditioning unit support 102 may comprise and upper segment and a lower segment, where its length is adjusted by sliding the upper segment and lower segment along their length with respect to one another. Length adjustments may be performed by aligning appropriate apertures in the inner sleeve and outer sleeve and inserting a securing pin or fastener through the aligned apertures. Length adjustments may also be performed by sliding the sleeves or segments along a series notches or grooves so that it each is seated in a desired notch or groove at the desired length.

Further, it should be appreciated that support 102 (illustrated as a single component at FIG. 1) may, in fact, comprise several structures that may be configured according to specific dimensions of an air conditioning unit. For example, support 102 may comprise two or more rods or beams extending between cross bar 101 and strut 103. The spacing between the multiple rods or beams may be configured be a user to support the edges of air conditioning unit 120. Such a configuration is thought to advantageous in that it will inhibit air conditioning unit 120 from becoming lopsided due to high winds, unbalanced weight, and the like.

Strut 103 extends between air conditioning unit support 102 and building 130. Strut 103 is a structural component that operates to resist the downward force exerted by air conditioning unit 120 on air conditioning unit support 102 that would otherwise cause air conditioning unit 120 to fall to the surface or rotate inward toward building 130. As such, strut 103 provides support for building 130, where the support has at least a component perpendicular to the surface of building 130, keeping air conditioning unit 120 separate from building 130. In this way, strut 103 restrains motion of air conditioning unit 120 with respect to building 130.

The length of strut 103 and the angles at which strut 103 extend between air conditioning unit support 102 and building 130 may vary according to different considerations. For example, 1) the orthogonal or near orthogonal distance from the surface of building 130 at which strut 103 meets air conditioning unit support 102, and/or 2) the distance below air conditioning unit support 102 at which strut 103 abuts the surface of building 130 may be varied. This may be done to accommodate air conditioning units of different lengths, city ordinances, applicable safety regulations, and the like. According to one embodiment, the distance from the surface of building 130 at which strut 103 meets air conditioning unit support 102 may be varied by sliding the end of strut 103 along a series notches or grooves so that it may be seated in a desired notch or groove. According other embodiments, strut 103 can be adjusted along the length of air conditioning unit support 102 by nut and bolt combinations, screws, or a reversible fastening mechanism, such as adjustable clamping or biasing means. For example, according to one embodiment, the upper end of strut 103 may be attached to air conditioning unit support 102 by a bolt or pin inserted through a pair of aligned apertures in each (defined through either the horizontal or vertical surfaces of each).

The distal end of strut 103 that abuts building 130 may itself be adjustable so that it remains flush against the surface of building 130 even where the angle of strut 103 changes with respect to the surface of building 130. Preferably, strut 103 comprises an adhesive material that provides sufficient resistance to alter movement, holding air conditioning unit support 102 (and therefore air conditioning unit 120) in a fixed position. According to another embodiment, the lower end of strut 103 may be in combination with or comprise a foot component 104. Foot component 104 preferably comprises a resilient, vibration isolation pad secured thereto, which effectively serves as a "non-skid" pad.

As seen from the previous description, air conditioning unit 120 is supported along building 130 by virtue of the physical arrangement between cross bar 101, air conditioning unit support 102, and strut 103, because the physical arrangement of those components provides sufficient forces against both the interior and exterior surfaces of building 130 in response to the downward force exerted by unit 120 on support 102. As such, no further mechanical support is needed. Instead, by virtue of this arrangement, the surfaces of building 130 are leveraged to secure air conditioning unit 120 thereto. That is, according to the embodiment illustrated in FIG. 1, the downward force exerted by air conditioning unit 120 on air conditioning unit support 102 operates to bias said window cross bar 101 toward said interior wall of building 130. In doing so, the bias is of sufficient magnitude to hold cross bar 101 at a fixed position at said interior surface of building 130. Simultaneously, the downward force exerted by air conditioning unit 120 on strut 103 to bias strut 103 toward exterior surface of building 130. In doing so, the bias is of sufficient magnitude to hold a distal end of strut 103 at a fixed position at the exterior surface of building 130.

For optimal installation of air conditioning unit 120, it must be angled downwardly from horizontal to allow condensation to drip from the rear of the air conditioner. To allow for such installation, air conditioning unit support 102 may further comprise level indicator 105, which includes a bubble floating in a liquid contained in an elongated, clear tube. The level indicator may also include a first line disposed across the tube toward the distal end thereof and a second line disposed across the tube toward the proximal end thereof. After placing assembled bracket air conditioning unit 120 in an initial position, reference may be made to level indicator 105. The angle of air conditioning unit support 102 may be adjusted as described above, until the floating bubble indicates that air condition unit 120 is tilted slightly below horizontal from building 130. In this regard, if the manufacturer suggests a particular angle or range of angles, then that angle should be set. If there is no suggested angle, then level indicator 105 may be employed to set an angle as described above.

It should be further appreciated that strut 103 may be actuated along the length of air conditioning unit support 102 between an extended position, where the upper end of strut 103 is at or near the distal portion of air conditioning unit support 102, and a retracted position, where lower portion of strut 103 is near or about the exterior surface of building 130. This feature, which may be implemented in combination with other features described with reference to FIG. 1, is described as a primary securing mechanism in the embodiment illustrated in FIGURE.

Figure 2:
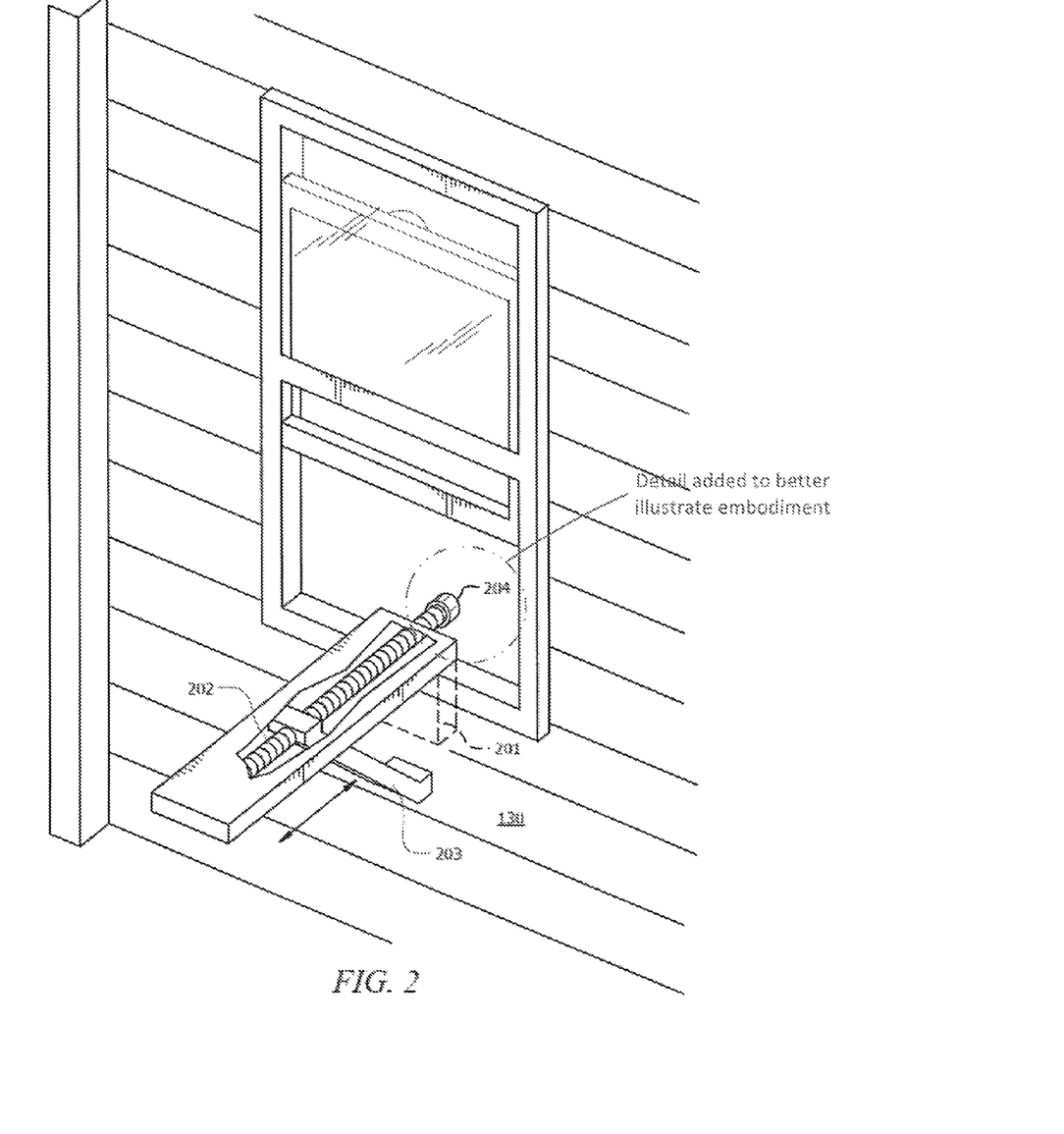
FIG. 2 illustrates another embodiment of a system for securing an air conditioning unit in which concepts described herein are applied.

FIG. 2 illustrates another embodiment of a system for securing an air conditioning unit in which concepts described herein are applied. According to FIG. 2, a first member (such as cross bar 201) is configured to be positioned about an interior surface of a building (such as building 230) and a third member (such as strut 203) is configured to be positioned about an exterior surface of the building. The first member and the third member are engaged with one another through a second member (such as air conditioning unit support 202), which extends between the interior surface of the building and the exterior surface of the building. The second member is also configured to support an air conditioning unit. Further, the third member is further configured to be actuated along the length of the second member between a first position and a second position. At the second position, the first member applies an outward force to the interior surface and the third member applies an inward force to the exterior surface, where the sum of the forces is sufficient to secure the air conditioning unit.

Air conditioning unit support system 200 is illustrated where strut 203 is actuated along the length of air conditioning unit support 202 between an expanded and retracted position, as previously described. In this embodiment, cross bar 201 may have a different configuration than that previously described with reference to FIG. 1. For example, cross bar 201, rather than span the entire width of a window, may instead be configured to wrap around or below the interior surface extending from the window. Cross bar 201 may have an aperture through which a first distal end of a threaded rod extends therethough, continues to extend along the length of air conditioning unit support 102 above the window sill, and extend to strut 203 at another distal end. A rotating mechanism, such as a knob or handle 204 is engaged with the threaded rod at one end along cross bar 201 and strut 203 is engaged with the threaded rod at another end. By virtue of that configuration, a user is able to continuously rotate knob 204 or handle in a given direction to actuate the strut 203 closer to or further from cross bar 201. According to such an embodiment, a user may secure air conditioning unit 220 at building 230 by turning knob or handle 204 at cross bar 201, causing strut 203 to approach the outer surface of building 230. Once strut 203 approaches the outside surface of building 230, continued actuating performed by the user will cause an initial force exerted by strut 203 against the outer surface of building 230 and an initial force exerted by cross bar 201 against the inner surface of building 230. As those forces increase, sufficient tension is created such that support system 200 is essentially clamped on the window at an appropriate position. During this process, the user can further adjust the angle of air conditioning unit 220 to be tilted horizontally from building 230 as previously discussed.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A system that secures an air conditioning unit at a fixed position, said system comprising:
   an adjustable first member that, when extended, extends beyond the width of a window of a building and abuts an interior surface of said building on either side of said window;
   a single support member comprising an inner sleeve and an outer sleeve, where an effective length of said single support member is adjustable by sliding said outer sleeve along the length of said inner sleeve;
   said single support member, when coupled to said first member, extends from the center of said first member at the center of said window, said single support member supporting said air conditioning unit; and
   a third member, when coupled to said single support member, extends between said single support member and an exterior surface of said building.

2. The system of claim 1 wherein the physical arrangement between said first member, said single support member, and said third member, when exerted upon by the downward force of said air conditioning unit, operates sufficiently to secure said air conditioning unit.

3. The system of claim 1 wherein the downward force exerted by said air conditioning unit on said single support member operates to bias said first member toward said interior wall of said building.

4. The system of claim 3 wherein said bias is of sufficient magnitude to hold said first member at a fixed position at said interior surface of said building.

5. The system of claim 1 wherein the downward force exerted by said air conditioning unit on said single support member operates to bias said third member toward said exterior wall of said building.

6. The system of claim 5 wherein said bias is of sufficient magnitude to hold a distal end of said third member at a fixed position at said exterior surface of said building.

7. The system of claim 1 wherein said first adjustable member comprises at least one telescoping portion at a distal end, said at least one telescoping portion configured to actuate between a retracted and an extended position.

8. The system of claim 7 wherein said at least one telescoping portion may be reversibly fixed at a position at one of or between said retracted and extended positions.

9. The system of claim 1 wherein said single support member is reversibly attached to said first member.

10. The system of claim 1 wherein said single support member comprises a plurality of adjustment mechanisms along its length, said plurality of adjustment mechanisms securing said third member at one of a plurality of positions along the length of said single support member.

11. The system of claim 10 wherein said adjustment may be performed to optimize adhesion of said third member to said exterior surface of said building.

12. The system of claim 1 wherein the angle at which said third member extends from said single support member is adjustable.

13. The system of claim 1 wherein said third member comprises an adhesive material that provides sufficient resistance to hold said air conditioning unit at a fixed position at its distal end abutting said exterior surface of said building.

14. A system for securing an air conditioning unit to a building, said system comprising:
   an adjustable first member that, when extended, extends beyond the width of a window of a building, said adjustable first member, when engaged with a single support member comprising an inner sleeve and an outer sleeve, where an effective length of said single support member is adjustable by sliding said outer sleeve along the length of said inner sleeve;
   said single support member extending from the center of said first member and said window, applies an outward force to an interior surface of said building in response to a downward force applied to an upper surface of said single support member by said air conditioning unit; and
   a third member, when engaged with said single support member, applies an inward force to an exterior surface of said building in response to said downward force applied to said upper surface of said single support member by said air conditioning unit.

15. A method for securing an air conditioning unit to a building, said method comprising:
   utilizing an adjustable first member that, when extended, extends beyond the width of a window of a building, said adjustable first member, when engaged with a single support member comprising an inner sleeve and an outer sleeve, where an effective length of said single support member is adjustable by sliding said outer sleeve along the length of said inner sleeve;
   said single support member extending from the center of said first member and said window, applies an outward force to an interior surface of said building in response to a downward force applied to an upper surface of said single support member by said air conditioning unit; and
   utilizing a third member, when engaged with said single support member, applies an inward force to an exterior surface of said building in response to said downward force applied to said upper surface of said single support member by said air conditioning unit.

* * * * *

UNITED STATES PATENT AND TRADEMARK OFFICE
CERTIFICATE OF CORRECTION

PATENT NO. : 9,447,916 B2  
APPLICATION NO. : 13/633095  
DATED : September 20, 2016  
INVENTOR(S) : Jason Darby et al.

Page 1 of 3

It is certified that error appears in the above-identified patent and that said Letters Patent is hereby corrected as shown below:

Drawing Sheet 1, consisting of Fig. 1, and Sheet 2, consisting of Fig. 2 should be replaced with the attached Drawing Sheets.

Signed and Sealed this
Twenty-eighth Day of February, 2017

Michelle K. Lee  
*Director of the United States Patent and Trademark Office*

FIG. 1

FIG. 2